United States Patent [19]
Hartvigsen et al.

[11] Patent Number: 5,612,149
[45] Date of Patent: Mar. 18, 1997

[54] FUEL CELL COLUMN HEAT EXCHANGER MATED MODULE

[75] Inventors: Joseph J. Hartvigsen, Kaysville; Ashok C. Khandkar, Salt Lake City; Singaravelu Elangovan, Sandy, all of Utah

[73] Assignee: Ceramatec, Inc., Salt Lake City, Utah

[21] Appl. No.: 581,989

[22] Filed: Jan. 2, 1996

[51] Int. Cl.$^6$ .............................. H01M 8/04; H01M 8/24
[52] U.S. Cl. .................. 429/26; 429/20; 429/34
[58] Field of Search .................... 429/26, 20, 34

[56] References Cited

U.S. PATENT DOCUMENTS

| | | |
|---|---|---|
| 3,394,032 | 7/1968 | Danner . |
| 3,488,224 | 1/1970 | Craig . |
| 4,254,086 | 3/1981 | Sanders . |
| 4,476,196 | 10/1984 | Poeppel et al. . |
| 4,476,197 | 10/1984 | Herceg . |
| 4,490,444 | 12/1984 | Isenberg . |
| 4,496,373 | 1/1985 | Behr et al. . |
| 4,499,663 | 2/1985 | Zwick et al. . |
| 4,510,212 | 4/1985 | Fraioli . |
| 4,640,875 | 2/1987 | Makiel . |
| 4,647,516 | 3/1987 | Matsumura et al. . |
| 4,650,727 | 3/1987 | Vanderborgh et al. . |
| 4,664,987 | 5/1987 | Isenberg . |
| 4,721,556 | 1/1988 | Hsu . |
| 4,729,931 | 3/1988 | Grimble . |
| 4,732,822 | 3/1988 | Wright et al. . |
| 4,750,918 | 6/1988 | Sirkar . |
| 4,753,857 | 6/1988 | Hosaka . |
| 4,761,349 | 8/1988 | McPheeters et al. . |
| 4,791,035 | 12/1988 | Reichner . |
| 4,824,742 | 4/1989 | Parry . |
| 4,853,301 | 8/1989 | Granata, Jr. et al. . |
| 4,874,678 | 10/1989 | Reichner . |
| 4,876,163 | 10/1989 | Reichner . |
| 4,877,506 | 10/1989 | Fee et al. . |
| 4,877,693 | 10/1989 | Baker . |
| 4,885,142 | 12/1989 | Suitor et al. . |
| 4,910,100 | 3/1990 | Nakanishi et al. . |
| 4,913,982 | 4/1990 | Kotchick et al. . |
| 4,943,494 | 7/1990 | Riley . |
| 4,963,442 | 10/1990 | Marianowski et al. . |
| 4,983,471 | 1/1991 | Reichner et al. . |
| 5,023,152 | 6/1991 | Akagi . |
| 5,045,413 | 9/1991 | Marianowski et al. . |
| 5,077,148 | 12/1991 | Schora et al. . |
| 5,079,105 | 1/1992 | Bossel . |
| 5,082,751 | 1/1992 | Reichner . |
| 5,175,062 | 12/1992 | Farooque et al. . |
| 5,186,806 | 2/1993 | Clark et al. . |
| 5,188,910 | 2/1993 | Ishihara et al. . |
| 5,227,256 | 7/1993 | Marianowski et al. . |
| 5,238,754 | 8/1993 | Yasuo et al. . |
| 5,252,409 | 10/1993 | Akagi . |
| 5,269,902 | 12/1993 | Khandkar et al. . |
| 5,298,341 | 3/1994 | Khandkar et al. . |
| 5,340,664 | 8/1994 | Hartvigsen . |
| 5,350,642 | 9/1994 | Akagi . |
| 5,366,819 | 11/1994 | Hartvigsen et al. . |
| 5,376,472 | 12/1994 | Hartvigsen et al. . |

FOREIGN PATENT DOCUMENTS

WO95/21469  8/1995  WIPO .

OTHER PUBLICATIONS

Dokiya et al., "Train Cell Stack By Wet Fabrication Processes", *IFCC The International Fuel Cell Conference*, IV–B–6, pp. 309–312 Feb. 1992.

*Primary Examiner*—John S. Maples
*Attorney, Agent, or Firm*—Trask, Britt & Rossa

[57] ABSTRACT

A fuel cell module (10) with a fuel cell column (18), having at least one fuel cell stack, mated with the planar wall of a heat exchanger (60), wherein the fuel cell column and heat exchanger are mounted to a support structure (30), and which define an air plenum between the fuel cell column and planar wall of the heat exchanger, thereby eliminating the ductwork and insulation requirements associated with heat exchange systems while increasing the efficiency of the heat exchanger.

6 Claims, 6 Drawing Sheets

FUEL CELL COLUMN HEAT EXCHANGER MATED MODULE

TECHNICAL FIELD

This invention relates generally to solid oxide fuel cell systems that electrochemically convert chemical energy from reactant gases into electrical energy, and more particularly to an improved and compact, high-efficiency fuel cell module being relatively easy to manufacture and assemble.

BACKGROUND ART

Solid oxide fuel cell ("SOFC") systems, which convert potential chemical energy from reactant gases into electrical energy, are well known in the art. See e.g., P.C.T. Patent Application PCT/US95/01404 to Elangovan et al., (published 1995). Fuel cell plates, having anode and cathode surfaces, are positioned parallel one another in stacks, separated by interconnectors having channels for air and gas flow. A fuel gas, such as $H_2$, CO, $CH_4$ or other hydrocarbon-containing gas, is fed through channels to the anode surfaces of the fuel cells. An air stream confining oxygen is fed in separate channels, typically orthogonal to the fuel gas channels, to the cathode surfaces of the fuel cells. An electrical current may be obtained by electrically connecting the anode and cathode due to the current flux of electrons involved in the electrochemical reaction.

The air stream must be pre-heated to prevent the cooling of the electrolyte plates below the operating temperature, typically between 800°–1000° C. SOFC systems employing various designs of heat exchangers, which transfer heat from the exhaust air stream to the incoming air stream, have been developed. See e.g., U.S. Pat. No. 5,340,664 to Hartvigsen, (Aug. 23, 1994), which is hereby incorporated herein in its entirety by reference.

Previously, SOFC systems utilizing heat exchangers have been hampered by extensive ducting and insulation requirements. Generally, the incoming air stream, after exiting the heat exchanger, is transferred through heavily insulated ductwork to a central air plenum where it is fed through the desired fuel cell stacks. Such ductwork and insulation requirements reduce the efficiency of the heat exchange system and increase the weight and cost of the SOFC system. The heat exchange plumbing also reduces the integrity of the supporting structural foundation and limits the fuel cell design configurations. In addition, manufacturing and fabrication of such systems is often difficult and costly. The heat exchange plumbing systems also make stack installation and system monitoring both difficult and inconvenient.

In view of the foregoing, a high-efficiency fuel cell module employing a heat exchanger, while reducing the necessary hardware and insulation requirements and facilitating accessibility, monitoring, fabrication and design variation, without compromising the structural integrity of the support, would be highly desirable.

DISCLOSURE OF THE INVENTION

The invention includes a fuel cell module that obviates many of the previously identified problems associated with fuel cell modules employing heat exchangers. The module is compact and has fewer components which reduces the volume and weight ratio per kilowatt. Further, the module's design is easier to manufacture and assemble than existing modules. The design also provides improved structural support for the module, and facilitates "stack loading" and monitoring. The design also allows for the use of a high-efficiency, single column configuration as well as a dual column configuration. In addition, the stack height and number of stacks may readily be varied to suit the particular operating requirements.

The invention includes various configurations housed in an insulated enclosure. Generally, a single column fuel cell is mated to the planar wall of a heat exchanger. Depending on the operating requirements, a pair of single column fuel cell structures, each being mated to the wall of its own heat exchanger, may also be employed within a single insulated enclosure. In the dual column design, the heat exchanger walls are positioned back to back, such that each single column fuel cell structure is the mirror image of the other.

The single column fuel cell structure includes at least one stack of fuel cell plates positioned parallel to the support structure. Each fuel cell plate is typically square-shaped, having a surface area of between about 25 to about 625 $cm^2$, and stacked in groups of between about 20 to about 100 cells. In one embodiment, two stacks of plates are positioned side-by-side in a single column. The stacks are positioned and sealed within manifold frames and sandwiched between support plates which are positioned perpendicularly to the manifold frames. In one embodiment, an end block is anchored on top of the fuel cell column to further maintain the planar orientation of the fuel cells. The ends of the fuel cell column are sealed to the heat exchanger wall with, for example, a moldable ceramic caulking material. An enclosed air plenum is maintained between the surface of the stacks and the heat exchanger wall.

An intake air stream is drawn through the heat exchanger and into the enclosed air plenum. In particularly suitable embodiments, the multiple stacks are mated parallel to the heat exchanger wall such that the intake air stream travels through a single stage, and the fuel gas, fed through fuel channels parallel to the heat exchanger wall, passes through multiple stages of the fuel cell column. In such configurations, the air stream passes through a single stage of the fuel cell column perpendicular to the heat exchanger wall, and the fuel gas stream flows parallel to the heat exchanger wall through multiple stages of the fuel cell column. The current thereby flows from the top of the stack toward the support structure.

The fuel gas is preferably passed through a reformer, housed within the insulated fuel cell module enclosure proximate the fuel cell column, prior to being delivered to the fuel cell column. In one particularly suitable embodiment, the fuel gas is passed through an afterburner after passing through the final stage of the fuel cell column, thereby increasing the thermal efficiency of the SOFC system.

Once the air stream is passed through the fuel cell column, the hot exhaust gas is released into the insulated module where it is then drawn back out through the heat exchanger. In one embodiment, the exhaust vents and the air plenum are positioned on opposite sides of the heat exchanger. In this configuration, the need for heat exchanger plumbing and ductwork insulation is eliminated, while the efficiency of the heat exchange system is increased, resulting in better air flow and improved thermal regulation. The integrity of the supporting structure is thereby enhanced, and the fabrication and accessibility of the heat exchanger column is facilitated.

BRIEF DESCRIPTION OF THE DRAWINGS

In the drawings, which depict presently preferred embodiments of the invention, and in which like reference numerals refer to like parts in different views.

BEST MODE OF THE INVENTION

Figure 1:
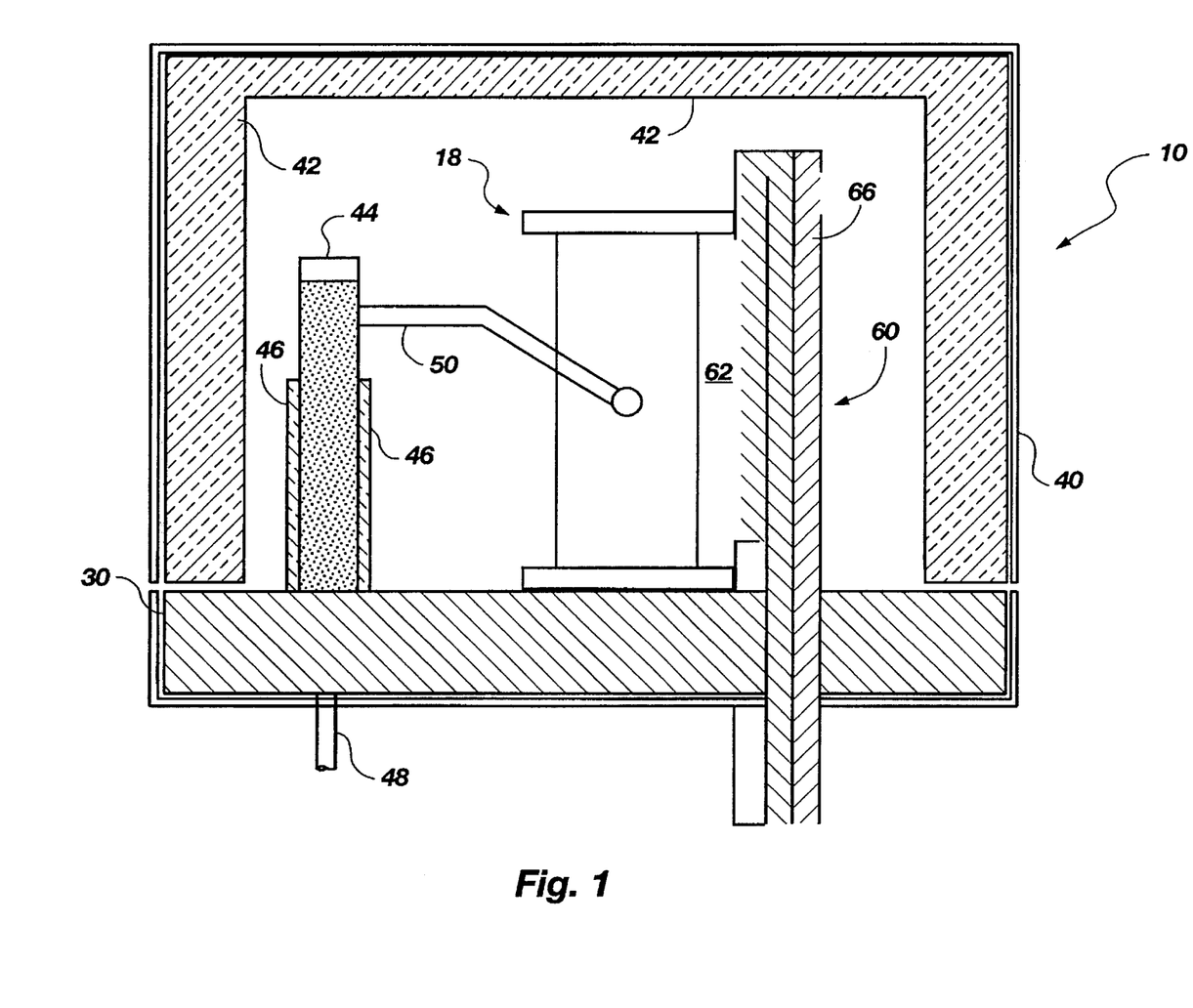
FIG. 1 is a side view of a single column fuel cell module embodying features of the instant invention.
Figure 2:
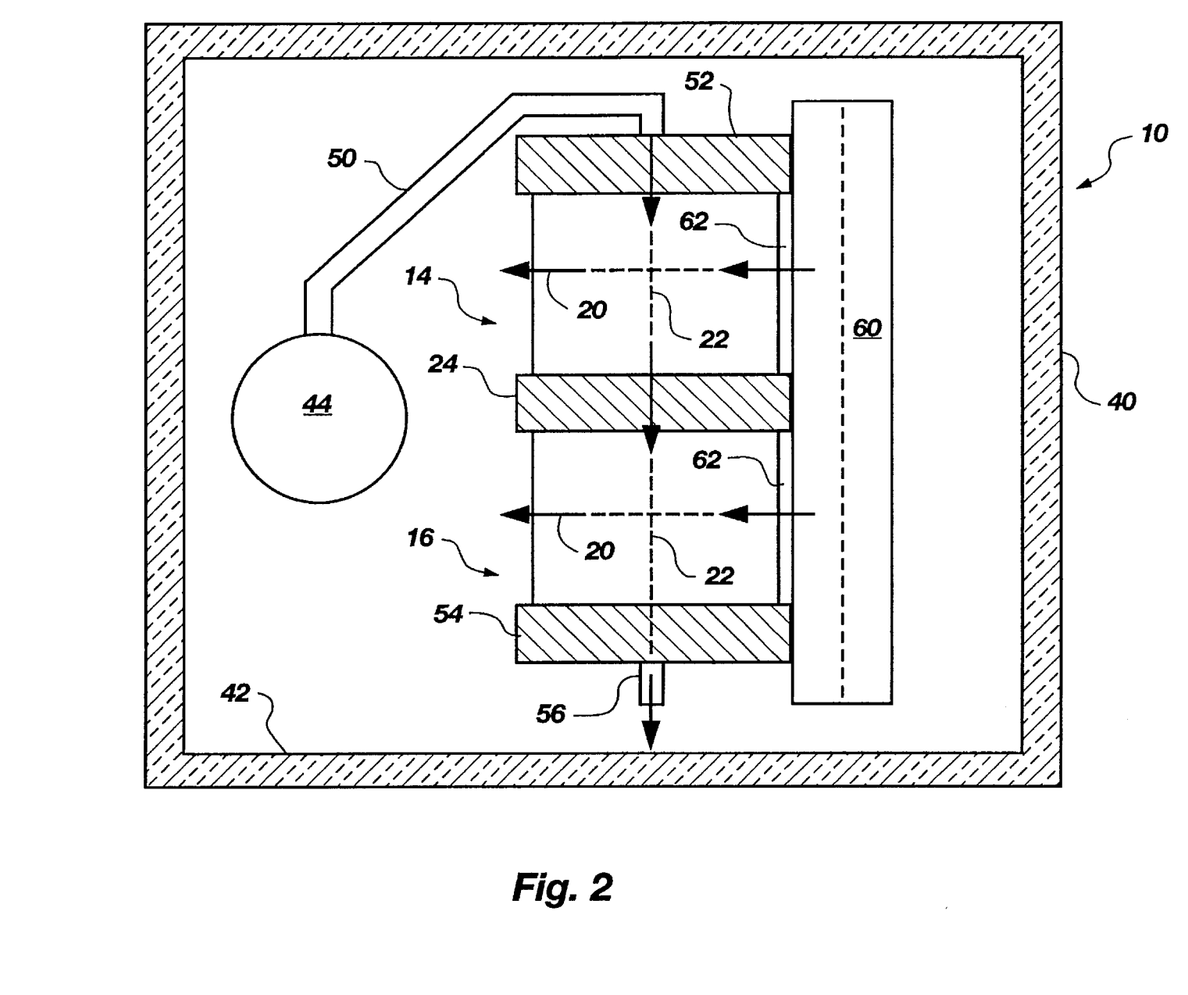
FIG. 2 is a top view of the single column fuel cell module of FIG. 1, having two stacks mated to the heat exchanger.
Figure 3:
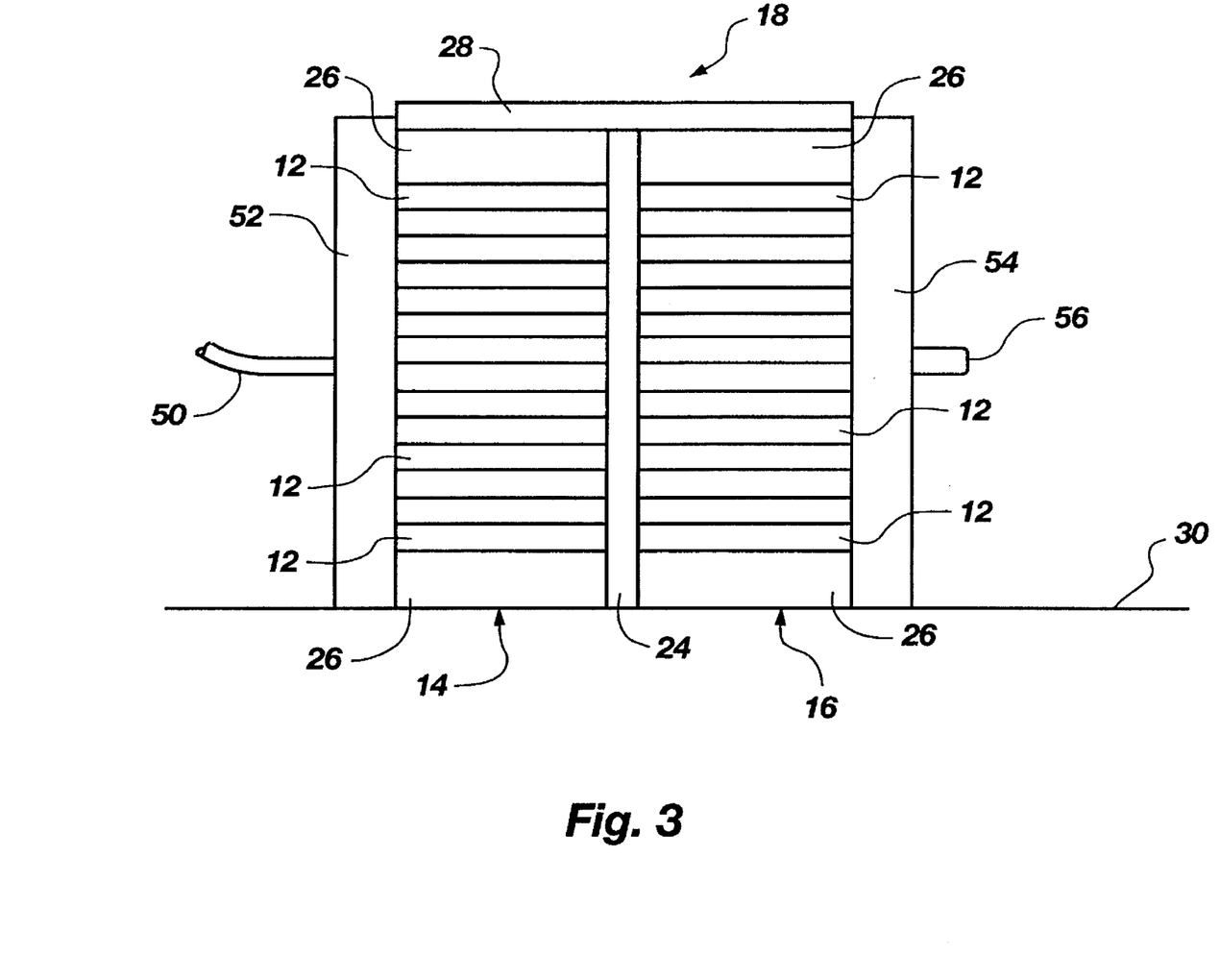
FIG. 3 is a front view of the single column fuel cell of FIGS. 1 & 2.

Referring to FIGS. 1 through 3, a SOFC module, generally 10, includes a plurality of planar solid oxide electrolyte plates 12 arranged into stacks 14 and 16 to form a single column 18 (FIG. 3). The electrolyte plates 12 may be constructed from solid oxide materials such as $ZrO_2$, $CeO_2$, $Bi_2O_3$ or like material useful in high-temperature fuel cell systems, and are preferably of square cross-sections having a surface area of about 100–225 $cm^2$. Each electrolyte plate 12 has an air face with an oxygen electrode (cathode) (not shown) affixed thereto, and a fuel face on the opposite side of the electrolyte plate 12 with a fuel electrode (anode) (not shown) affixed thereto. Preferably, successive electrolyte plates 12 are separated from adjacent plates by cross-flow grooved interconnectors (not shown).

One set of interconnector grooves forming air flow channels is oriented along the axis of the dotted line indicated by reference numeral 20 in FIG. 2. The grooves on the opposite side of the interconnector forming fuel flow channels are oriented along the axis of the dotted line indicated by reference numeral 22. This arrangement provides for flow of reactant gases in a cross-flow manner through the electrolyte plates 12. Air flowing through the air flow channels oriented along the axis identified by dotted line 20 is in fluid communication with the oxygen electrodes, while fuel gases flowing through the fuel flow channels oriented along axis 22 are in fluid communication with the fuel electrodes.

Adjacent stacks are sealed to a generally planar manifold frame 24 that permits reactant gases flowing along axis 22 to flow in series through successive stacks 14 and 16. In a preferred embodiment, the fuel stacks 14 and 16 include about 40–80 fuel cells 12, stacked about three fuel cells 12 per centimeter (about six to about eight fuel cells 12 per inch). The manifold frame 24 is easily applied to the stacks, and its design allows for convenient inspection of the seal to identify gas-leaks between the stacks and manifold frame 24. The fuel cells 12 are sandwiched between horizontal support plates 26, as shown in FIG. 3. In a preferred embodiment, an end block 28 is positioned on top of the fuel cell column 18 to maintain the planar orientation of the fuel cells 12, and to support the fuel cell column 18. The end block 28 may be anchored to the support structure 30 by appropriate fasteners (not shown).

An enclosure 40, having insulation 42, is attached to the support structure 30 by suitable fasteners (not shown). A fuel reformer 44, having insulation 46, is attached to the support structure 30 within the enclosure 40. A fuel gas intake line 48 leads through the support structure 30 into the fuel reformer 44. A fuel delivery line 50 transports the fuel from the fuel reformer 44 to the intake manifold frame 52, where the fuel gas is distributed evenly to each of the fuel cells 12. Once the fuel gas passes through the exhaust manifold frame 54, the fuel gas is fed into an afterburner 56 to increase the efficiency of the SOFC system.

Figure 4:
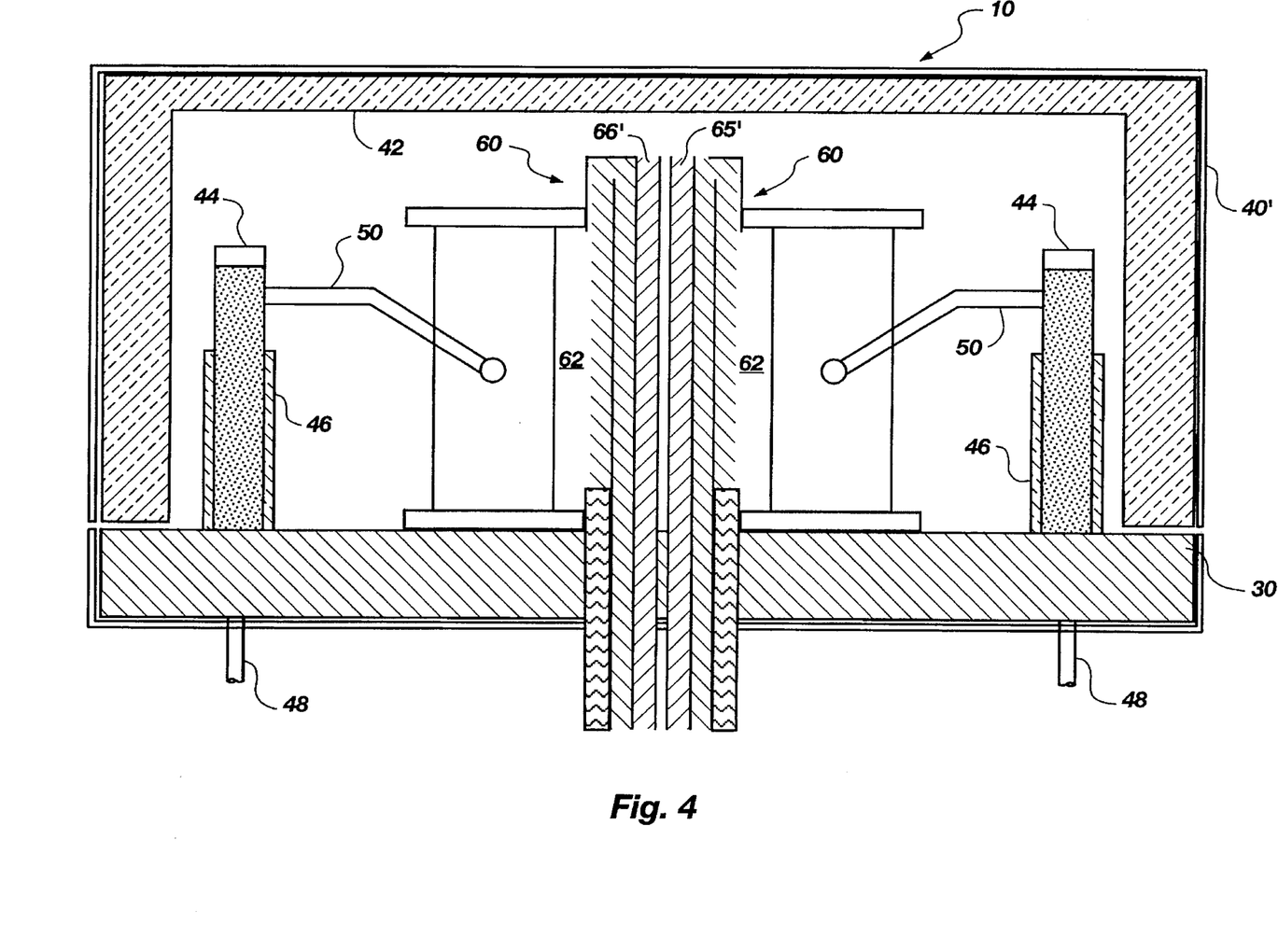
FIG. 4 is a side view of a dual column fuel cell module according to the invention.

The fuel column 18 is mated with a suitable sealant to the wall of a heat exchanger 60. In a preferred embodiment, a single column fuel cell structure having two fuel cell stacks is mated to the wall of a corrugated plate-type heat exchanger. An intake air stream containing oxygen is delivered through the support structure 30 in the heat exchanger 60. The intake air is then fed into the air plenum 62, deformed by the seal between the fuel cell column 18, the wall of the heat exchanger 60, and the support structure 30. The air stream is then fed into a single stage of the fuel cell column 18, typically at about ten times the volume of that required for stoichiometric combustion. The hot exhaust air exiting the fuel cell column 18 is collected within the enclosure 40, and drawn out of the fuel cell module through the intake vent 66 at the back side of the heat exchanger 60 and out through the support structure 30. The intake vent 66 may be positioned in the heat exchanger on the opposite wall of the air plenum 62 (back wall), as shown in FIG. 1, or on the top of the heat exchanger toward the back wall, as indicated by reference numeral 66' in FIG. 4, A dual column fuel cell module 10' is shown in FIG. 4. Two identical single column fuel cell systems, as shown in FIGS. 1–3, are positioned adjacent one another. The back walls of the heat exchangers 60 are positioned a suitable distance apart as required for air flow access to intake vent 66.

Figure 5:
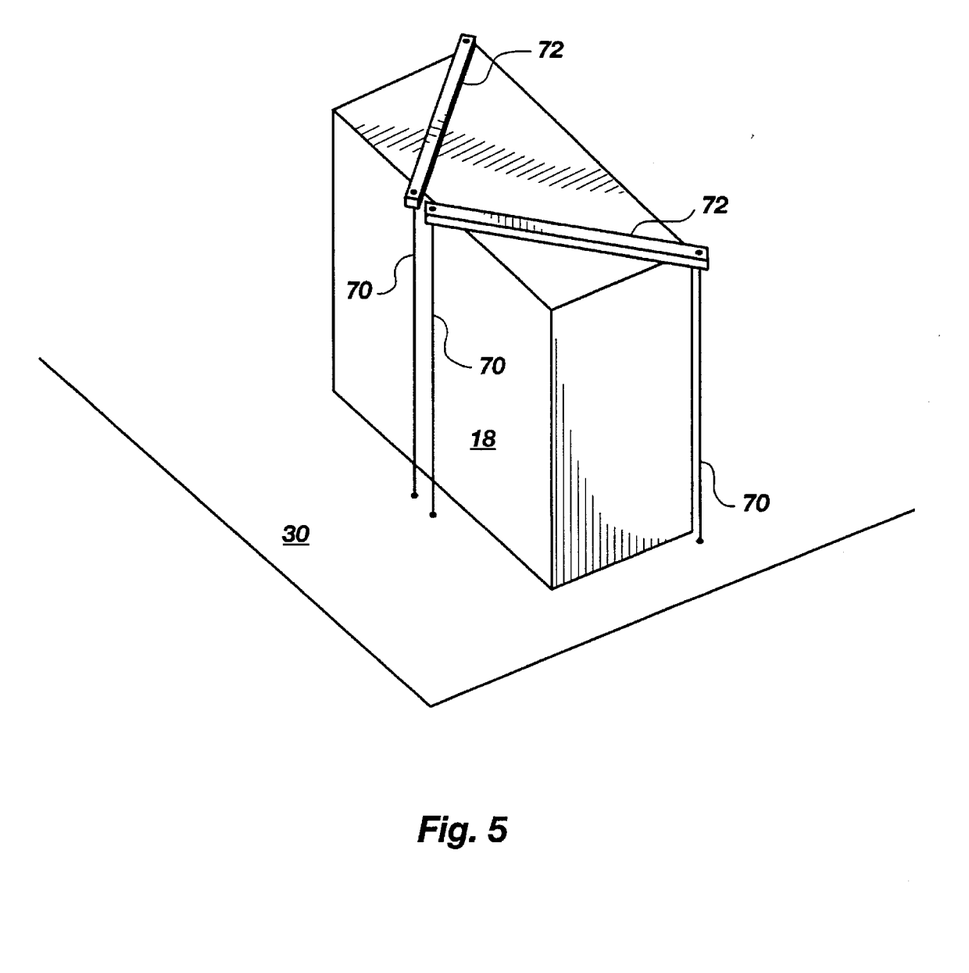
FIG. 5 is a perspective view of the single column fuel cell, illustrating the bars and support rods used for mounting the fuel cell column.
Figure 6:
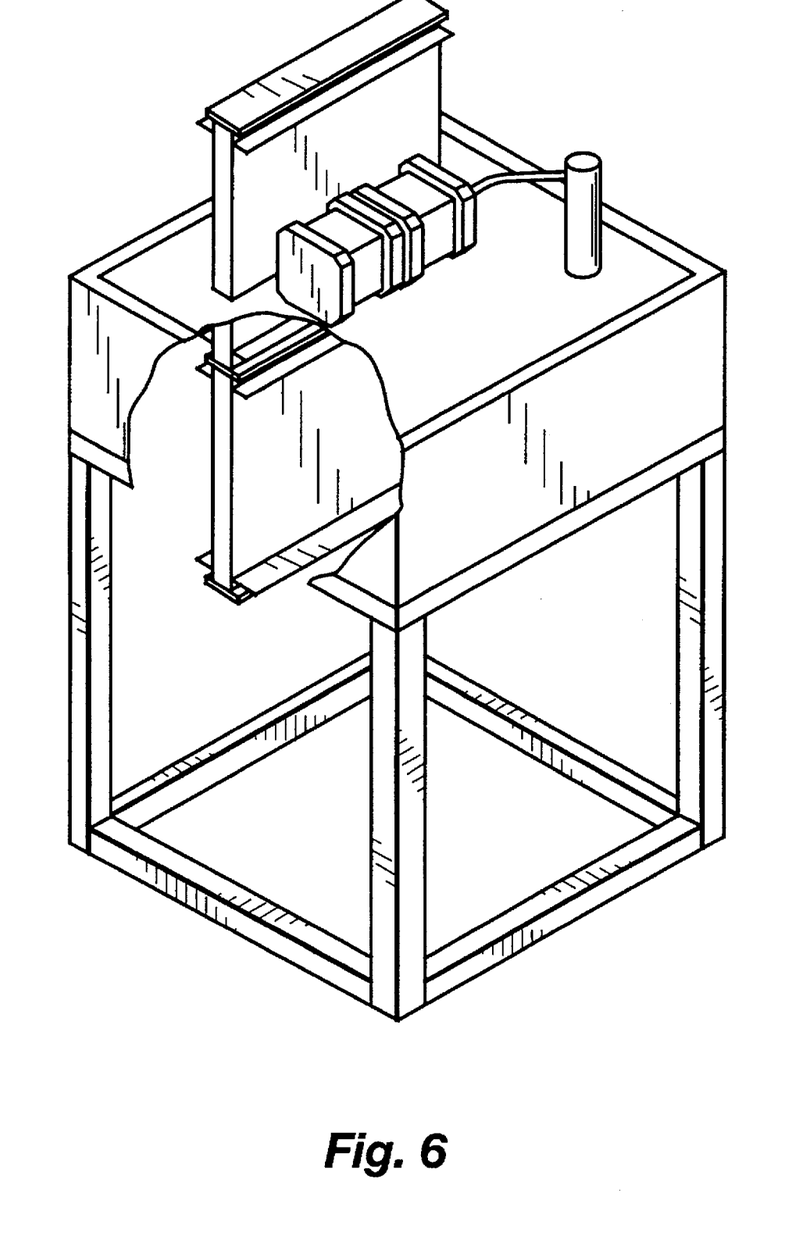
FIG. 6 is an isometric view of the single column fuel cell, illustrating the bars and support rods used for mounting the fuel cell column.

During operation of the SOFC module, the fuel cell column 18 is mounted to the support structure 30 to prevent movement or significant vibration. Referring to FIG. 5, the fur cell column 18 is typically anchored with support rods 70 attached to the support structure 30 at one end, and bars 72 on the top surface of the fuel cell column 18 at the other end. The support rods 70 are typically fastened to springs (not shown) mounted below the support structure 30, creating a significant stress force on the support structure 30. The integrity of the support structure 30 is thus important to ensure a proper anchoring of the fuel cell column 18.

The mating of the heat exchanger 60 with the fuel cell column 18 eliminates the need for heat exchanger duct work, and allows for a proper mounting of the fuel cell column 18 to the support structure 30, thereby reducing the size, cost and weight of the fuel cell module 10. In addition, the manufacturing of the fuel cell module 10 is greatly facilitated, while the efficiency of the heat exchange system is increased.

The invention is further explained by the following illustrative EXAMPLES.

EXAMPLE I

A 1 kW dual column fuel cell module as described in EXAMPLE I and as depicted in FIG. 1 of U.S. Pat. No. 5,480,738 to the inventors hereof was made. The module had eight cube stacks (10 cm (approx. 4 in.)) incorporated into four columns with two stacks in each column. The stacks in three columns had metal interconnectors, while the stacks in the other column had ceramic interconnectors. The columns were placed in an outer housing made of Inconel (Inco Alloys of Canada). Heat exchangers were incorporated into the module housing, as was insulation, to heat the air coming from the air inlet. Reformers containing a commercially available stream reforming catalyst (R-67-7H of Haldor Topsøe of Denmark) were used. The fuel gas was desulfurized natural gas.

The column consisted of two 40 cell stacks with a cell area of 10 cm×10 cm and an electrode active area of 80 $cm^2$/cell. The cell consisted of 150 to 180 micrometer thick electrolyte made of yttria stabilized zirconia, 15 to 25 micrometer thick strontium-doped lanthanum manganite cathode, and, 25–40 micrometer thick nickel-cermet anode. Natural gas and steam were fed to the reformer and then through one end of the column, and after passing through both stacks in a series manner, exit at the other end of the column. Between the two stacks, the manifold provides adequate volume to provide thorough mixing of the fuel from various channels of the upstream stack before the fuel enters the downstream stack. The fuel flow rate was adjusted to achieve the desired fuel efficiency (utilization) at the stack operating point. The air was manifolded to have parallel flow to each stack, i.e., the air flow has a single pass through each of the stacks. The air flow rate can be adjusted to achieve the desired cooling required for the stack and/or the air exhaust temperature required for the heat exchanger and/or to meet the additional power producing thermal cycle needs.

EXAMPLE II

The dual column fuel cell module of EXAMPLE I was compared with the single column fuel cell as disclosed herein. Peak stack performance in the heat-exchanger mated module disclosed herein was 30% greater than that of the fuel cell module of EXAMPLE I, while operating at 850° compared to 900° C in the dual column unit. The improved performance for the single column fuel cell reflects the improved system configuration as well as advances in cell and stack technology.

Although the invention has been described with regard to certain preferred embodiments and examples, the scope of the invention is to be defined by the appended claims.

What is claimed is:

1. A fuel cell module comprising:

a support structure for attaching components of said fuel cell module thereto;

an insulating enclosure removably sealed to the support structure defining a module housing within;

a plurality of manifold frames joining and sealing a fuel cell stack into a fuel cell column; and a heat exchanger mounted on said support structure, said heat exchanger having a planar wall matingly engaged to said fuel cell column defining an air plenum between the planar wall of the heat exchanger, the fuel cell column, and the support structure.

2. The fuel cell module of claim 1 wherein the fuel cell column is formed of two fuel cell stacks, the two fuel cell stacks being in fluid communication with the air plenum.

3. The fuel cell module of claim 1 including said heat exchanger associated therewith for exchange of thermal energy from hot gases exhausted from said stacks to cooler incoming reactant gases.

4. The fuel cell module of claim 1 wherein fuel gases flow serially through fuel flow channels in successive stacks in a column.

5. The fuel cell module of claim 4 further comprising a reformer for reforming fuel gas prior to flow of the fuel gas to a first stack in said column.

6. The fuel cell module of claim 1 further comprising a plurality of said modules configured and arranged into a multi-module fuel cell system.

* * * * *

UNITED STATES PATENT AND TRADEMARK OFFICE
CERTIFICATE OF CORRECTION

PATENT NO. : 5,612,149
DATED : March 18, 1997
INVENTOR(S) : Hartvigsen et al.

It is certified that error appears in the above-identified patent and that said Letters Patent is hereby corrected as shown below:

In Column 4, line 17, change "deformed" to --defined--;

In Column 4, line 39, change "fur" to --fuel--;

In Column 5, line 13, after "and" delete ", " comma.

Signed and Sealed this

Thirty-first Day of March, 1998

Attest:

BRUCE LEHMAN

*Attesting Officer*     *Commissioner of Patents and Trademarks*